United States Patent
Trehus et al.

(10) Patent No.: US 6,963,954 B1
(45) Date of Patent: Nov. 8, 2005

(54) METHOD AND APPARATUS FOR OPTIMIZING PREFETCHING BASED ON MEMORY ADDRESSES

(75) Inventors: Eric Trehus, San Jose, CA (US); Kuan-Yuh Ko, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 500 days.

(21) Appl. No.: 09/957,342

(22) Filed: Sep. 19, 2001

(51) Int. Cl.[7] ......................... G06F 12/08; G06F 13/04
(52) U.S. Cl. ......................... 711/137; 711/171; 711/213
(58) Field of Search ................ 711/137, 146, 204–205, 711/208, 213, 221, 1, 166, 4, 170–171, 111–112; 710/22, 15, 52, 57, 313, 8–10; 709/224, 220–222; 712/207, 237–240; 713/1, 100

(56) References Cited

U.S. PATENT DOCUMENTS

| | | | | |
|---|---|---|---|---|
| 5,146,578 A | * | 9/1992 | Zangenehpour | 711/137 |
| 5,381,539 A | * | 1/1995 | Yanai et al. | 711/133 |
| 5,606,665 A | * | 2/1997 | Yang et al. | 711/154 |
| 6,012,106 A | * | 1/2000 | Schumann et al. | 710/22 |
| 6,195,735 B1 | * | 2/2001 | Krueger et al. | 711/204 |
| 6,393,457 B1 | * | 5/2002 | Allison et al. | 709/201 |
| 6,567,894 B1 | * | 5/2003 | Hsu et al. | 711/137 |
| 2002/0042861 A1 | * | 4/2002 | Kavipurapu | 711/118 |

* cited by examiner

Primary Examiner—Denise Tran
(74) Attorney, Agent, or Firm—Marger Johnson & McCollom, PC

(57) ABSTRACT

Address based prefetch logic varies prefetching according to address values in read requests. The address based prefetch logic can vary how much data is initially read into a prefetch buffer or when a prefetch buffer is refilled to an initial prefetch amount. One advantage of the address based prefetch logic is that prefetching and prefetch buffer refill rates are tuned for particular application. This is important since the system controller ordinarily does not know how much data the master is requesting beyond the first data phase. The requested read address is used as a hint to determine how much prefetching needs to occur. Over prefetching wastes memory bandwidth, and potentially adds latency to other masters sharing common busses. Under prefetching may cause the system controller that is acting as a PCI target to terminate the master's read request, thus wasting PCI bandwidth, adding latency.

27 Claims, 5 Drawing Sheets

METHOD AND APPARATUS FOR OPTIMIZING PREFETCHING BASED ON MEMORY ADDRESSES

BACKGROUND OF THE INVENTION

A system controller connects memory and a Peripheral Component Interconnect (PCI) bus together. In one instance, the controller is considered a PCI target and another device on the PCI bus that initiates a read transaction is referred to as a PCI master. The term prefetch refers to the PCI target reading data in anticipation that the PCI master will not terminate the read transaction immediately after a first data phase is completed.

The PCI target may disconnect after the first data phase, but doing so leads to inefficient use of the PCI bus. It is more efficient for the PCI target to burst the data across the PCI bus until the master terminates the PCI transaction.

The system controller supports bursting by prefetching data from memory. In one example, the first four bytes of data is technically not a prefetch, since the PCI master device requests a minimum of four bytes (assuming 32 bit PCI bus). Any additional data read beyond the first four bytes before the PCI master has requested it is considered the prefetched data.

Not all memory transactions require prefetching or the same amount of prefetching. Excessive prefetching needlessly consumes bandwidth on the memory interface, internal busses within the system controller, as well as in a coherent system, the bus where snooping takes place.

The present invention addresses this and other problems associated with the prior art.

SUMMARY OF THE INVENTION

Address based prefetch logic varies prefetching according to address values. The address based prefetch logic can vary how much data is initially read into a prefetch buffer or when a prefetch buffer is refilled to an initial prefetch amount. One advantage of the address based prefetch logic is that prefetching and prefetch buffer refill rates are tuned for particular address locations. This is important since the device that originally requested the read transaction can stop reading data at anytime. The address based prefetch logic reduces unnecessary prefetching thus preserving system resources.

DETAILED DESCRIPTION OF THE INVENTION

Address Based Prefetch Logic

Figure 1:
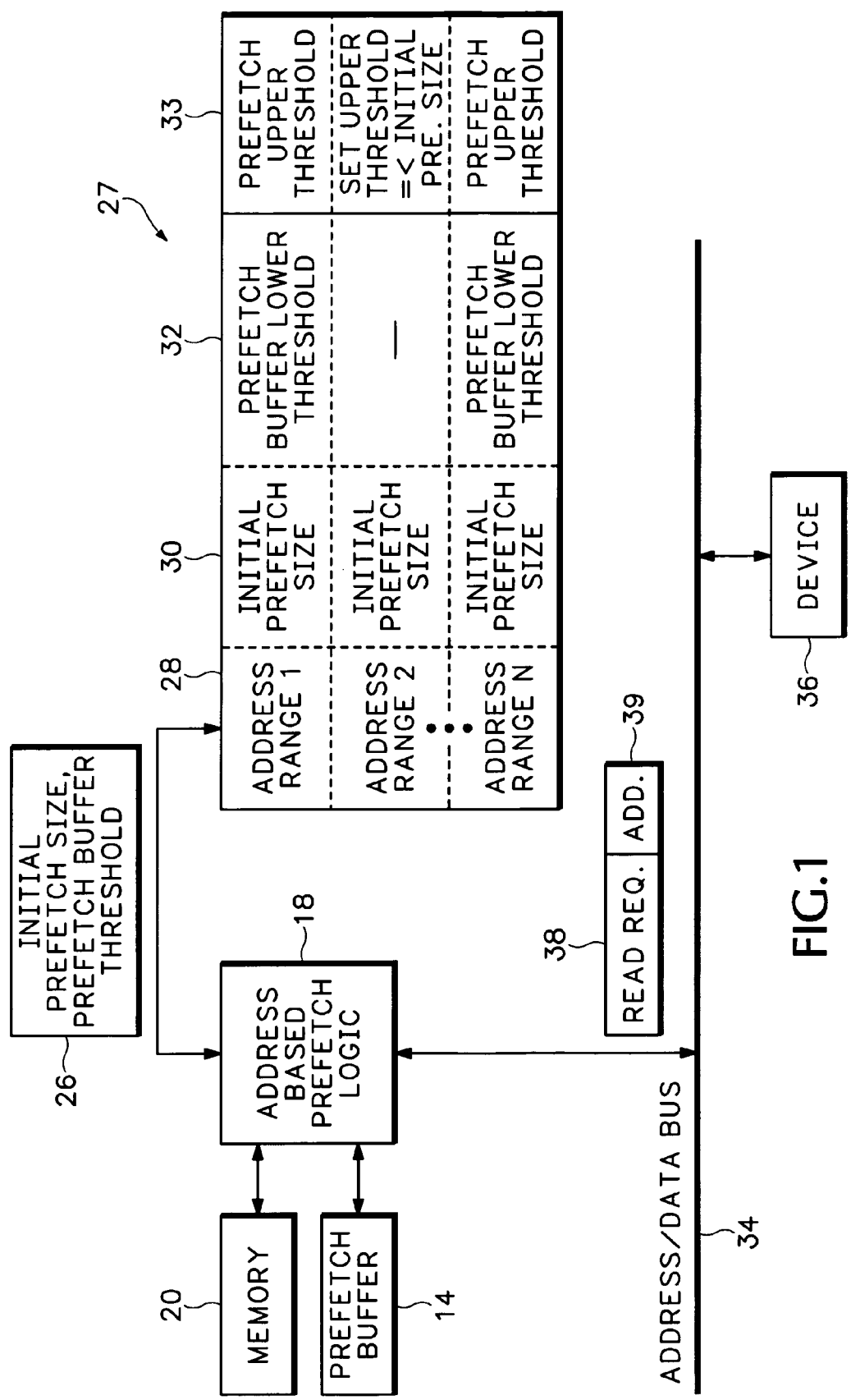
FIG. 1 is a block diagram of address based prefetch logic.

FIG. 1 shows circuitry that varies the amount of prefetching according to address values. An address/data bus 34 is used by a device 36 to read data from a memory 20. The device 36 can be any computer, network interface card, peripheral device, etc. The device 36 sends a read request 38 on bus 34. A protocol used on bus 34 provides an address 39 of the read request 38 for memory 20, but not the length of the read. Address based prefetch logic 18 is coupled to the bus 34 and varies prefetching according to the address value 39 in the read request 38. The address based prefetch logic 18 is also coupled to a prefetch buffer 14, memory 20 and a prefetch table 27.

The prefetch table 27 stores address ranges 28 associated with different amounts of prefetching. Parameters 30, 32 and 33 are used for tuning prefetching for the different associated address ranges 28. Initial prefetch size values 30 in prefetch table 27 control the initial amount of memory prefetching that is performed for the different address values 28. Prefetch buffer lower threshold values 32 determine how many bytes in the prefetch buffer 14 are read before automatically performing another prefetch.

A prefetch buffer upper threshold value 33 can optionally be used in table 27 for setting an upper limit on prefetching. The threshold values 33 cause the address based prefetch logic 18 to terminate a data transfer once the upper limit specified in the threshold value 33 is reached. The prefetch buffer upper threshold values 33 set an upper limit that stops prefetching after the specified number of bytes have been prefetched, even if the associated prefetch buffer lower threshold value 32 is reached. Any combination of the parameters in prefetch table 27 can be used by the address based prefetch logic 18 to tune prefetching for different address ranges.

The address based prefetch controller 18 also has the ability to disable refilling of the prefetch buffer 14. That is to say, prefetching can be customized for particular address ranges to only perform initial prefetching and no additional prefetching. In one example this is configured by setting prefetch upper threshold value equal to or less than the initial prefetch size. This is shown in address range 2 in table 27 where the prefetch upper threshold value is equal to or less than the initial prefetch size. This causes the address based prefetch logic 18 to perform only an initial prefetch and not to prefetch addition data.

Figure 2:
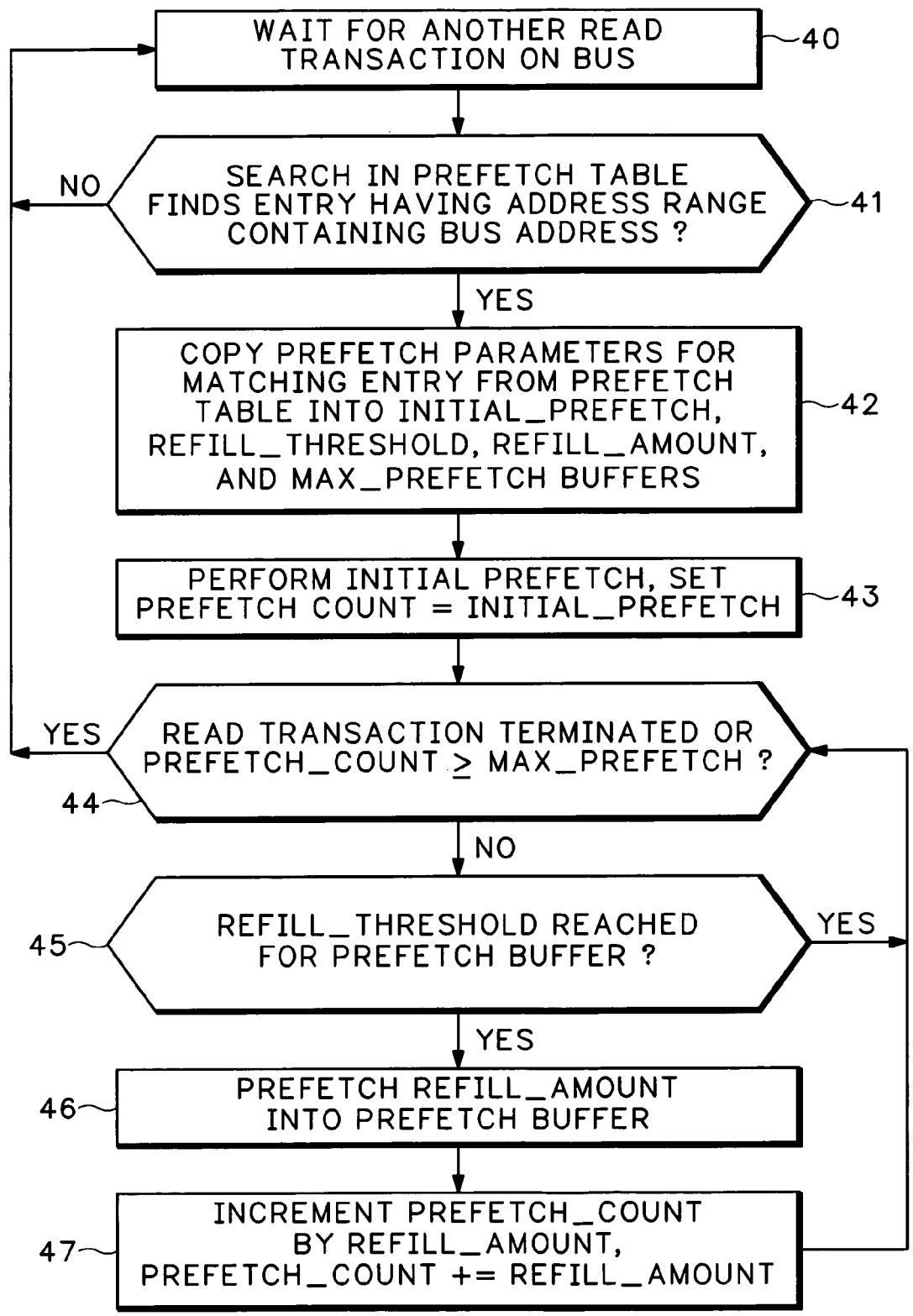
FIG. 2 is a flow diagram showing how the address based prefetch logic operates.

FIG. 2 describes in further detail how the prefetch circuitry in FIG. 1 operates. The address based prefetch logic 18 monitors the bus 34 in block 40 for read requests. If a read request is detected, the prefetch logic 18 searches the prefetch table 27 in block 41 for any address range entries that may contain the address in the read request. If there is no address range entry that includes the read transaction address, then the prefetch logic 18 goes back to monitoring for other read transactions in block 40. If a read transaction address from bus 34 is contained by one of the address range entries 28 in prefetch table 27, the prefetch logic 18 copies the prefetch parameters for the matching entry from the prefetch table in block 42. The prefetch parameters include any combination of the initial prefetch size, refill threshold value, refill amount and maximum prefetch size that are then loaded into buffers, registers, etc. used during the prefetching operation.

The address based prefetch logic 18 in block 43 then performs an initial prefetch from memory into the prefetch buffer and sets a prefetch count to be the same as the initial prefetch size. If the read transaction is terminated or the maximum prefetch size is exceeded, the prefetch logic 18 in block 44 ends the prefetch routine and goes back to waiting for other read transactions in block 40. The prefetch logic may be performing address based prefetching for several read transactions at the same time.

While the read transaction has not been terminated and the maximum prefetch value has not been reached, the prefetch logic in block 45 waits for the prefetch buffer to reach the refill threshold value. If the prefetch buffer reaches the refill threshold value, the prefetch logic in block 46 prefetches the refill amount of bytes into the prefetch buffer. The prefetch count is then incremented by the refill amount in block 47. The process then repeats starting from block 44.

Application Example for Address Based Prefetch Logic

Figure 3:
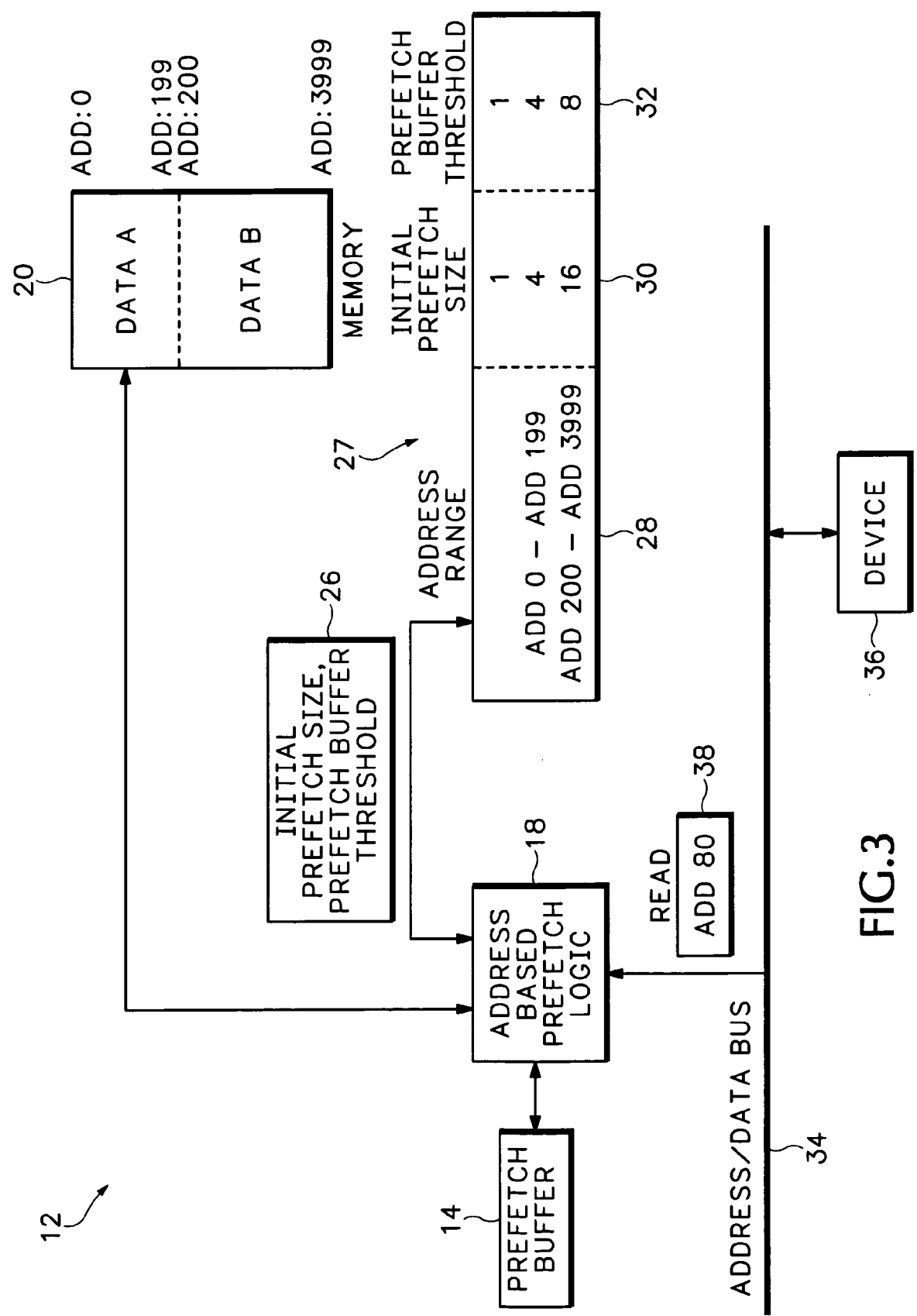
FIG. 3 shows one application for the address based prefetch logic.

FIG. 3 shows one example application. Data in address locations ADD 0–ADD 199 in memory 20 contains control type data that is typically read by device 36 in small amounts.

Conversely, the data in address locations ADD 200–ADD 3999 contains payload data that is usually read from memory 20 in long busts of many bytes. The address based prefetch logic 18 optimizes prefetching for these two types of data stored in memory 20.

A first type of prefetching is used for the control type data stored in address locations ADD 0–ADD 199. A relatively small amount of prefetching is performed for the control type data located in ADD 0–ADD 199. For example, device 36 initiates an initial read request at address 80 for four bytes of data. The address based prefetch logic 18 identifies an address range in prefetch table 27 that includes address value 80 and uses the prefetch parameters associated with the identified address range for prefetching.

In this example, the address based prefetch logic 18 prefetches an additional four bytes of data from memory 20, in addition to the four bytes of data at address location 80. The address based prefetch logic 18 then conducts additional prefetches depending only upon the amount of data in prefetch buffer 14. For example, another prefetch is initiated when four bytes of data remain in prefetch buffer 14.

A second type of prefetching is performed for the payload data stored in address locations ADD 200–ADD 3999. The second type of prefetching reads a larger initial number of bytes from memory 20 into the prefetch buffer 14. For example, assume the address read request 38 now requests address location 500. The address based prefetch logic 18 prefetches an additional sixteen bytes of data from memory 20, in addition to the four bytes of data at address location 500. The address based prefetch logic 18 also tunes the prefetch buffer threshold value according to the type of data in address locations 200–3999. In one example, additional prefetches are initiated whenever fewer than eight bytes of data remain in prefetch buffer 14.

Application Example for the Address Based Prefetch Logic In a System Controller

Figure 4:
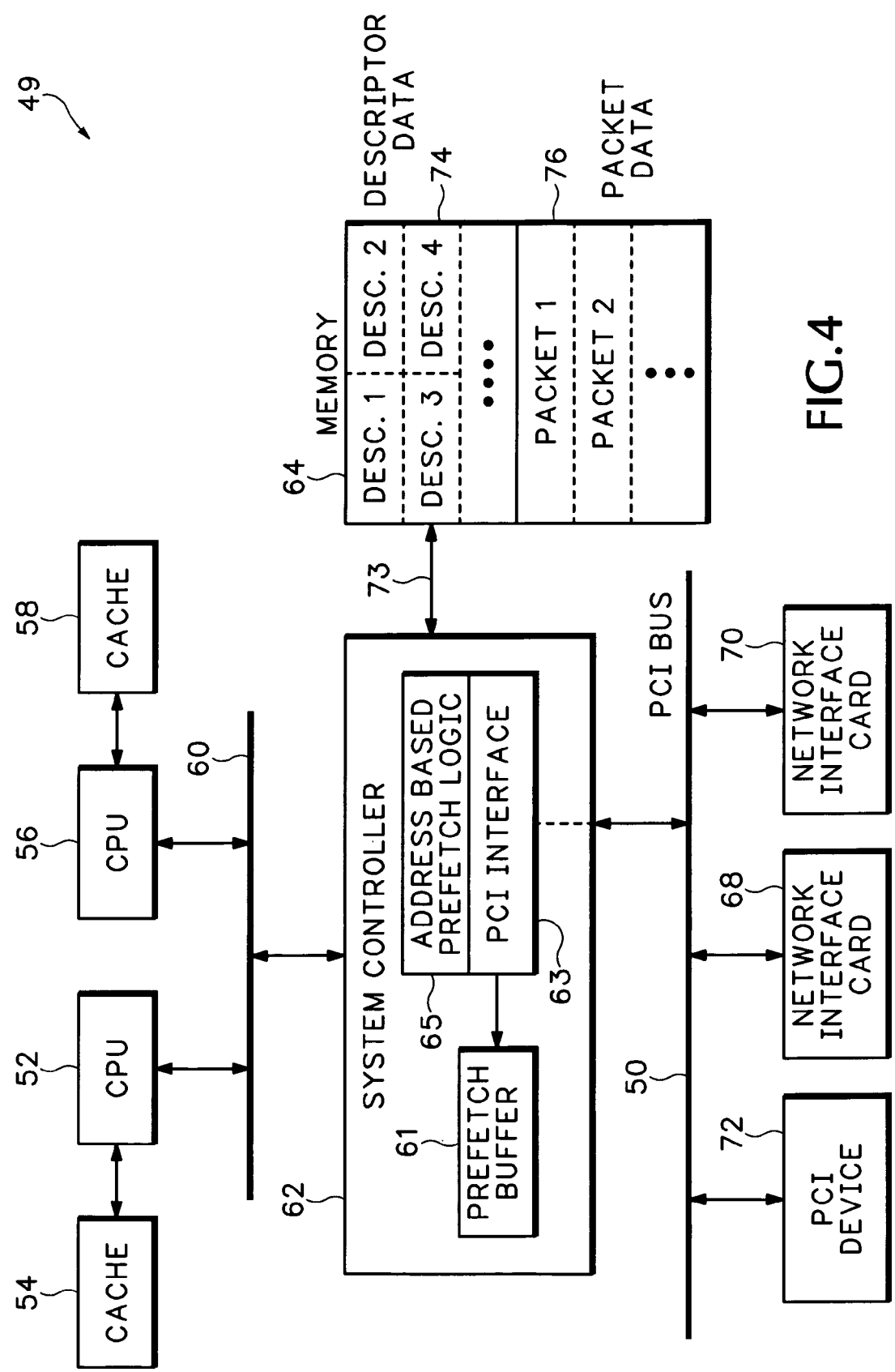
FIG. 4 is a block diagram of another application of the address based prefetch logic used for a network processing device.

FIG. 4 shows one example of address based prefetch logic 65 used in a system controller 62 for a network processing device 49. The system controller 62 interconnects together a PCI bus 50, a memory 64, processors 52 and 56 and other devices. A description of the Peripheral Component Interconnect (PCI) bus is available from the PCI Special Interest Group, 5200 Elam Young Parkway, Hillsboro, Oreg. In one example, the memory 64 is a Synchronous Dynamic Random Access Memory (SDRAM), but any internal or external memory can be used.

A PCI interface 63 within the system controller 62 serves as both a master and a target for PCI transactions. However, the PCI interface 63 is never both the master and target of the same PCI transaction. A target portion of the PCI interface 63 contains the address based prefetch logic 65.

Virtually all system controllers that interconnect PCI and memory have some prefetching logic. However, the address based prefetch logic 65 uses the requested address to vary the amount of initial prefetching and threshold for subsequent prefetching. This permits bursting of read data on the PCI bus yet provides tuning capabilities to limit or minimize the amount of prefetching. This reduces the impact of non-consumed prefetched data on other buses within the network processing device 49. The address based prefetch logic 65 reduces the impact of non-consumed prefetch data on the memory interface 73, internal busses, and the processor bus 60 where snooping occurs.

In one implementation, one or more network interface cards 68 and 70 are coupled to the PCI bus 50. The network interface cards 68 and 70 in one example are Medium Access Control (MAC) cards that connect one or more Ethernet networks to the PCI bus 50. However, any type of network interface or other PCI device 72 can also be coupled to the PCI bus 50. In one example, the CPUs are PowerPC processors manufactured by Motorola, Inc. and use an MPX bus protocol to communicate over bus 60.

The system controller 62 supports cache coherency with CPU caches 54 and 58 that are used by CPUs 52 and 56, respectively. To maintain cache coherency a transaction is run on the address bus 60 for each cacheline address corresponding to the read of memory 64. If the CPU has a more recent copy of the data in its cache 54 or 58, then memory 64, the CPU through coherency protocols provides the read data to the system controller 62. The system controller 62 than forwards the data to the requester and to memory 64. In this particular application, the memory 64 has particular locations that store descriptor data 74. Descriptor data 74 usually includes various control parameters, packet length information, flags, etc. that are used for processing and locating packet data in memory 64. It has been determined that descriptor data is usually only a few bytes long. In one example, one descriptor is eight bytes long. Thus, a read request for descriptor data 74 does not typically require prefetching large blocks of data from memory 64.

The memory 64 also includes locations used for storing packet data 76. It has been determined that the packet data 76 is often read in large blocks in sequential order from the memory 64. The descriptor data 74 and the packet data 76 are also stored in predefined address ranges in memory 64.

The address based prefetch logic 65 identifies read transactions on PCI bus 50 associated with descriptor data 74 and distinguishes them from read transactions associated with packet data 76. The initial prefetch size and prefetch buffer threshold values used in the address based prefetch logic 65 are then customized to more efficiently read the descriptor data 74 and the packet data 76 from memory 64.

For example, a first initial prefetch size is used for address ranges associated with descriptor data 74 to prefetch bytes for one complete descriptor. If a descriptor is eight bytes long for example, and four bytes of data are read at a time, then the initial prefetch size is selected to initially prefetch four additional bytes of data from memory 64. This reduces latency by not having to request and wait for a second read request to be completed. Because only one initial prefetch is requested, resources in system controller 62 are not wasted prefetching additional bytes of data from memory 64 that are not needed by the PCI master.

The prefetch buffer threshold value 32 (FIG. 1) can also be configured to be lower or disabled for descriptor data reads. For example, the threshold value may be set to zero so that no additional prefetches are performed by the system controller 62 until all of the data in prefetch buffer 61 is read. Also as mentioned above, a prefetch buffer upper threshold can be used to limit an amount of data that is prefetched. In one implementation, the prefetch buffer 61 is a First In-First Out (FIFO), but any other type of storage circuitry can also be used.

The initial prefetch size and prefetch buffer threshold values are configured differently for address ranges associated with packet data. Typically it is advantageous to burst large amounts of data to the master PCI device when a packet read request is detected. Therefore, the initial prefetch size is increased for address ranges associated with packet data. The prefetch buffer threshold value is also tuned for packet reads. For example, the prefetch buffer threshold value can be configured to automatically prefetch an additional eight bytes of data whenever eight or less bytes of data remain in the prefetch buffer 61.

Figure 5:
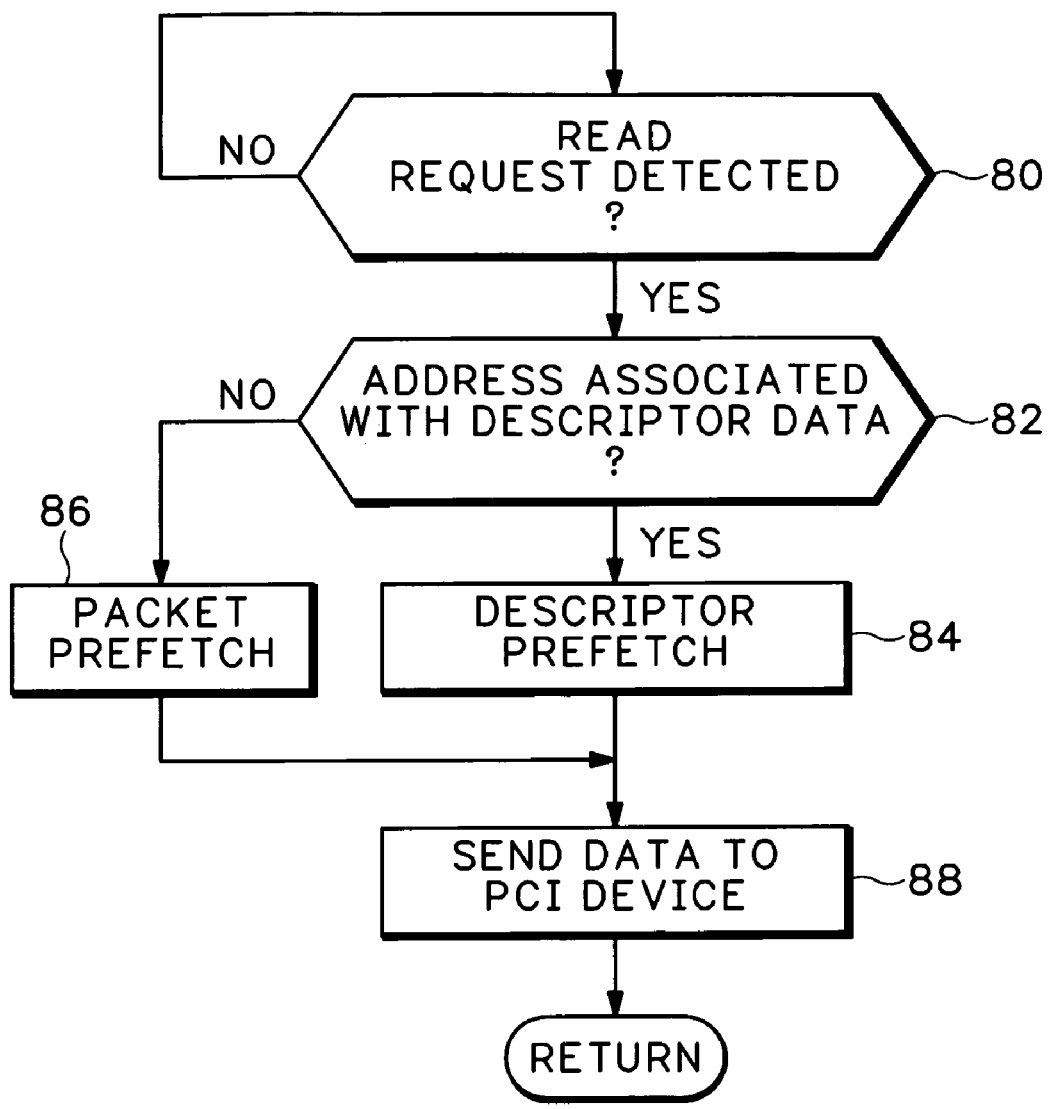
FIG. 5 is flow diagram showing how the address based prefetch logic operates in the network processing device.

FIG. 5 shows in further detail how the address based prefetch logic 65 in FIG. 4 controls prefetching for a network processing device. The address based prefetch logic 65 (FIG. 5) detects a read request over the PCI bus 50 from a PCI device in block 80. The address based prefetch logic 65 in block 82 compares the PCI read address with the prestored address range values. If the address falls within a particular range, then the prefetching parameters associated with that range are used. In the case of this example, one range corresponds to packet memory buffers, another range corresponds to descriptor memory. If the address is associated with memory range that store packet data, then prefetching is tuned for packet reads in block 86 as described above. Packet data is prefetched from memory and sent to the PCI device in block 88.

If the address is associated with a memory range that stores descriptor data in block 82, then prefetching is customized for descriptor reads in block 84. As mentioned above, this usually means prefetching a relatively smaller number of bytes compared to packet data prefetching. The prefetch buffer threshold value can also be tuned to perform additional prefetches when a larger amount of bytes still remain in the prefetch buffer. The requested data is then sent to the requesting PCI device in block 88.

FIGS. 3, 4 and 5 give examples of how the address based prefetch logic is configured for different types of data used in a network processing device. However, the address based prefetch logic can be configured for other types of data other than descriptor data and packet data. For example, the address based prefetch logic can be configured for any type of control data or different types of packet data, such as long packets, short packets, various quality of service packets, etc. The address based prefetch logic can also be configured for any application performed by any computer systems, such as Personal Computers (PCs), network servers, etc. where a prefetch scheme needs to be customized for different types of data read requests.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

What is claimed is:

1. A system, comprising:
   address based prefetch logic that varies an amount of prefetching from a storage device according to predetermined prefetch parameters of received address values;
   wherein the prefetch parameters specifying the amount of prefetching are predetermined prior to accessing any data stored in the storage device; and
   wherein the prefetch parameters that determine the amount of prefetching include multiple different individually configurable initial prefetch size values that are predetermined prior to accessing any data stored in the storage device and that identify different amounts of data to initially prefetch from the storage device for received address values within different address ranges.

2. The system according to claim 1 wherein the prefetch parameters used for specifying the amount of prefetching are not varied according to an amount of data read from the storage device.

3. The system according to claim 2 wherein the prefetch parameters further include prefetch buffer lower threshold values associated with the stored address values for prefetching according to an amount of data in a prefetch buffer;
   wherein different individually configurable prefetch buffer lower threshold values are assigned to different stored address value ranges that each determine independently of the prefetch size values how much data must be read from the prefetch buffer before additional prefetching is performed.

4. The system according to claim 3 wherein the prefetch parameters further include a different individually configurable prefetch upper limit values that are individually tunable for the different stored address value ranges and that each limit independently of the initial prefetch size values a total amount of data that is prefetched into the prefetch buffer for the different stored address value ranges.

5. The system according to claim 4 wherein one or more of the prefetch upper limit values are set equal to or below an associated initial prefetch size value for the same address range for disabling an associated prefetch buffer lower threshold values for the same address range and stopping prefetching in the prefetch buffer even when the associated prefetch buffer lower threshold value indicates additional prefetching is required in the prefetch buffer.

6. The system according to claim 1 wherein the stored address range values of the storage device distinguish between addresses storing descriptor data and addresses storing packet data;

wherein both of the descriptor data and the packet data are stored in the storage device.

7. The system according to claim 6 wherein the address based prefetch logic controls how much descriptor data and packet data is prefetched.

8. The system according to claim 1 wherein the address based prefetch logic is implemented in a network processing device.

9. A system, comprising:
address based prefetch logic that varies an amount of prefetching from a storage device according to predetermined prefetch parameters of received address values where the predetermined prefetch parameters vary by address range and are determined prior to accessing any data stored in the storage device; and
wherein the prefetch parameters include different initial prefetch size values associated with different received address value ranges for identifying how much data to initially prefetch from the storage device.

10. A method for controlling prefetching, comprising:
monitoring address values used for accessing a storage device;
varying prefetching of data from the storage device according to predetermined prefetch parameters of the storage address values;
identifying a first address range for at least some of the storage address values storing one type of data and identifying a second address range for at least some of the storage address values storing a second type of data different than the first type of data;
prefetching a first initial amount of data from the storage device when the address values are within the first address range and prefetching a second initial amount of data different from the first initial amount of data from the storage device when the address values are within the second address range; and
using multiple different individually configurable initial prefetch size values that are predetermined prior to accessing any data stored in the storage device to determine the first initial amount of data prefetching and the second initial amount of data prefetching.

11. The method according to claim 10 including disabling any repeated prefetching from storage device when the address values are within the first or second address range.

12. The method according to claim 10 including assigning different individually configurable prefetch buffer lower threshold values to different stored address value ranges that each determine independently of the initial prefetch size values how much data must be read from the prefetch buffer before additional prefetching is performed.

13. The method according to claim 10 including associating a descriptor read with at least some of the monitored address values.

14. The method according to claim 13 including associating a packet read with at least some of the monitored address values.

15. The method according to claim 10 including:
identifying a first address associated with descriptor data;
identifying a second address associated with packet data;
prefetching an amount of descriptor data equal to one descriptor from the storage device when the first address is detected; and
prefetching a different amount of packet data when the second address is detected.

16. Computer code stored on a computer readable medium, comprising:

code for monitoring address values used for accessing a storage device;
code for varying prefetching of data from the storage device according to predetermined prefetch parameters of the storage address values;
code for identifying a first address range for at least some of the storage address values and identifying a second address range for at least some of the address values;
code for prefetching a first initial amount of data from the storage device when the address values are within the first address range and prefetching a second different initial amount of data from the storage device when the address values are within the second address range; and
code for using multiple different individually configurable initial prefetch size values that are predetermined prior to accessing any data stored in the storage device to determine the first initial amount of data prefetching and the second initial amount of data prefetching.

17. The computer code according to claim 16 including code for disabling any repeated prefetching from storage device when the address values are within the first or second address range.

18. The computer code according to claim 16 including code for prefetching at a first prefetch buffer threshold when the address values are within the first address range and prefetching at a second prefetch buffer threshold when the address values are within the second address range.

19. The computer code according to claim 16 including code for associating a descriptor read with at least some of the monitored address values.

20. The computer code according to claim 19 including code for associating a packet read with at least some of the monitored address values.

21. The computer code according to claim 16 including:
code for identifying a first address associated with descriptor data;
code for identifying a second address associated with packet data;
code for prefetching an amount of descriptor data equal to one descriptor from the storage device when the first address is detected; and
code for prefetching a different amount of packet data when the second address is detected.

22. A system for controlling prefetching, comprising:
means for monitoring address values used for accessing a storage device;
means for varying prefetching of data from the storage device according to predetermined prefetch parameters of the storage address values,
means for identifying a first address range for at least some of the storage address values and identifying a second address range for at least some of the address values; and
means for prefetching first initial amount of data from the storage device when the address values are within the first address range and prefetching a second different initial amount of data from the storage device when the address values are within the second address range; and
means for using multiple different individually configurable initial prefetch size values that are predetermined prior to accessing any data stored in the storage device to determine the first initial amount of data prefetching and the second initial amount of data prefetching.

23. The system according to claim 22 including means for disabling any repeated prefetching from storage device when the address values are within the first or second address range.

24. The system according to claim 22 including means for prefetching at a first prefetch buffer threshold when the address values are within the first address range and prefetching at a second prefetch buffer threshold when the address values are within the second address range.

25. The system according to claim 22 including means for associating a descriptor read with at least some of the monitored address values.

26. The system according to claim 25 including means for associating a packet read with at least some of the monitored address values.

27. The system according to claim 22 including:

means for identifying a first address associated with descriptor data;

means for identifying a second address associated with packet data;

means for prefetching an amount of descriptor data equal to one descriptor from the storage device when the first address is detected; and means for prefetching a different amount of packet data when the second address is detected.

* * * * *

UNITED STATES PATENT AND TRADEMARK OFFICE
CERTIFICATE OF CORRECTION

| | | |
|---|---|---|
| PATENT NO. | : 6,963,954 B1 | Page 1 of 1 |
| APPLICATION NO. | : 09/957342 | |
| DATED | : November 8, 2005 | |
| INVENTOR(S) | : Trehus et al. | |

It is certified that error appears in the above-identified patent and that said Letters Patent is hereby corrected as shown below:

On the title page, under ABSTRACT, please replace the last word "latency." with

--latency, and possible causing under run conditions for the master.--

At column 6, line 50 please replace "include a different" with --include different--

Signed and Sealed this

Twenty-sixth Day of December, 2006

JON W. DUDAS
*Director of the United States Patent and Trademark Office*